(12) United States Patent
Krishna et al.

(10) Patent No.: US 9,174,876 B2
(45) Date of Patent: *Nov. 3, 2015

(54) DIELECTRIC MATERIALS FOR POWER TRANSFER SYSTEM

(75) Inventors: Kalaga Murali Krishna, Bangalore (IN); Lohit Matani, Varanasi (IN); Adnan Kutubuddin Bohori, Bangalore (IN); Suma Memana Narayana Bhat, Bangalore (IN); Somakumar Ramachandrapanicker, Bangalore (IN)

(73) Assignee: General Electric Company, Niskayuna, NY (US)

(*) Notice: Subject to any disclaimer, the term of this patent is extended or adjusted under 35 U.S.C. 154(b) by 1344 days.

This patent is subject to a terminal disclaimer.

(21) Appl. No.: 12/778,166

(22) Filed: May 12, 2010

(65) Prior Publication Data

US 2011/0278940 A1    Nov. 17, 2011

(51) Int. Cl.
*H02J 17/00*    (2006.01)
*C04B 35/468*   (2006.01)
(Continued)

(52) U.S. Cl.
CPC ............ *C04B 35/4682* (2013.01); *C04B 35/462* (2013.01); *C04B 35/465* (2013.01);
(Continued)

(58) Field of Classification Search
CPC .......... H02J 5/005; H02J 7/025; H02J 17/00; H04B 5/00; H04B 5/0012; H04B 5/0037; H04B 5/0081; H04B 5/0093; C04B 35/462; C04B 35/465; C04B 35/468; C04B 35/4682; C04B 2235/3236

USPC ............. 252/500, 520.12, 520.2, 520.22; 501/136–139; 307/104, 31; 290/1 R; 333/219, 219.1; 320/108
See application file for complete search history.

(56) References Cited

U.S. PATENT DOCUMENTS 4,323,617 A    4/1982   Mandai et al.
4,326,617 A    4/1982   Mochida et al.
(Continued)

FOREIGN PATENT DOCUMENTS

CN    1384079 A     12/2002
EP    0571948 B1    2/2000
(Continued)

OTHER PUBLICATIONS

Zhuo et al, "Dielectric Properties of Bismuth Doped BST/SYF Composites," Piezoelectrics and acoustooptics, 2005, V 27, No. 6, pp. 668-670, 687.*

(Continued)

*Primary Examiner* — Colleen Dunn
(74) *Attorney, Agent, or Firm* — Paul J. DiConza (57) ABSTRACT

A contactless power transfer system is proposed. The power transfer system comprises a field-focusing element comprising a dielectric material. The dielectric material comprises a composition that is selected from the family of $(Ba,Sr)TiO_3$ or $CaCu_3Ti_4O_{12}$. The compositions of the $(Ba, Sr)TiO_3$ include the materials such as $Ca_{1-x-y}Ba_xSr_yTi_{1-z}Cr_zO_{3-\delta}N_p$, wherein $0<x<1$; $0<y<1$; $0\le z\le 0.01$; $0\le\delta\le 1$; and $0\le p\le 1$. The compositions of the $CaCu_3Ti_4O_{12}$ include the materials such as $Ca_{1-x-y}Ba_xSr_y(Ca_{1-z}Cu_z)Cu_2Ti_{4-\delta}Al_\delta O_{12-0.5\delta}$, wherein $0\le x<0.5$; $0\le y<0.5$; $0\le z<1$; and $0\le\delta\le 0.1$.

22 Claims, 5 Drawing Sheets

(51) Int. Cl.
  *C04B 35/465* (2006.01)
  *C04B 35/462* (2006.01)
  *C04B 35/47* (2006.01)
  *H01F 3/14* (2006.01)

(52) U.S. Cl.
  CPC ............... *C04B 35/47* (2013.01); *H01F 3/14* (2013.01); *C04B 2235/3208* (2013.01); *C04B 2235/3213* (2013.01); *C04B 2235/3215* (2013.01); *C04B 2235/3217* (2013.01); *C04B 2235/3227* (2013.01); *C04B 2235/3234* (2013.01); *C04B 2235/3236* (2013.01); *C04B 2235/3241* (2013.01); *C04B 2235/3244* (2013.01); *C04B 2235/3281* (2013.01); *C04B 2235/3298* (2013.01); *C04B 2235/40* (2013.01); *C04B 2235/445* (2013.01); *C04B 2235/483* (2013.01); *C04B 2235/604* (2013.01); *C04B 2235/656* (2013.01); *C04B 2235/658* (2013.01); *C04B 2235/6567* (2013.01); *C04B 2235/6582* (2013.01); *C04B 2235/6585* (2013.01); *C04B 2235/77* (2013.01); *C04B 2235/80* (2013.01); *C04B 2235/85* (2013.01)

(56) References Cited

U.S. PATENT DOCUMENTS

| | | | |
|---|---|---|---|
| 4,670,409 | A | 6/1987 | Okawa et al. |
| 4,888,246 | A | 12/1989 | Kuwata et al. |
| 5,136,270 | A | 8/1992 | Hatanaka et al. |
| 6,268,054 | B1 | 7/2001 | Costantino et al. |
| 6,300,267 | B1 | 10/2001 | Chen et al. |
| 6,936,559 | B2 | 8/2005 | Li et al. |
| 6,970,055 | B2 * | 11/2005 | Toncich ............... 333/24 C |
| 7,029,971 | B2 | 4/2006 | Borland et al. |
| 7,294,598 | B2 | 11/2007 | Brize et al. |
| 7,465,497 | B2 | 12/2008 | Tan et al. |
| 7,741,396 | B2 | 6/2010 | Tan et al. |
| 7,910,510 | B2 | 3/2011 | Paul et al. |
| 2004/0063566 | A1* | 4/2004 | Caspers et al. ............. 501/134 |
| 2005/0110641 | A1 | 5/2005 | Mendolia et al. |
| 2005/0207094 | A1 | 9/2005 | Borland et al. |
| 2007/0121274 | A1 | 5/2007 | Talvacchio et al. |
| 2008/0218940 | A1 | 9/2008 | Singh et al. |
| 2009/0058189 | A1* | 3/2009 | Cook et al. ................ 307/104 |
| 2009/0128262 | A1 | 5/2009 | Lee et al. |
| 2009/0297804 | A1* | 12/2009 | Paul et al. ................ 428/210 |
| 2011/0121778 | A1 | 5/2011 | Oyobe et al. |
| 2011/0234010 | A1* | 9/2011 | Bohori et al. ............. 307/104 |
| 2011/0278940 | A1 | 11/2011 | Krishna et al. |

FOREIGN PATENT DOCUMENTS

| | | |
|---|---|---|
| JP | 4946197 A | 5/1974 |
| JP | 5654024 A | 5/1981 |
| JP | 2005132698 A | 5/2005 |
| JP | 2005200232 A | 7/2005 |
| JP | 2009106136 A | 5/2009 |
| JP | 2009126742 A | 6/2009 |
| JP | 2011236122 A | 11/2011 |
| WO | 2004004118 A1 | 1/2004 |
| WO | 2008150262 A1 | 12/2008 |
| WO | 2009031639 A1 | 3/2009 |
| WO | 2010035321 A1 | 4/2010 |
| WO | 2010036980 A1 | 4/2010 |

OTHER PUBLICATIONS

Bing Qin, Dengren Jin, Jinrong Cheng and Zhongyan Meng; Dielectric Properties of (Ba, Sr, Ca)TiO3 Ceramics for Tunable Microwave Devices; IEEE Xplore; 4 Pages, IEEE, ISBN 978-1-4244-1331-7, 2006.
Bing Qin, Dengren Jin, Jinrong Chen, and Zhongyan Meng; Dielectric Properties of Cr2O3 Doped (Ba,Sr, Ca)TiO3 Ceramics for Tunable Microwave Devices; Materials Research Society; Mater. Res. Soc. Symp. Proc. vol. 966, 2007; 7 Pages.
Juanjuan Xing, Hui Gu, Alexandre Gloter, Hui Shen, Xiaoming Pan, Pingchu Wang; Bismuth nanoprecipitation at grain boundaries during microstructural evolution in (Sr,Ba)TiO3 ceramics; Science Direct; Acta Materialia 55 (2007) 5323-5332.
S. F. Shao, J. L. Zhang, P. Zheng, C. L. Wang, J. C. Li, and M. L. Zhao; High permittivity and low dielectric loss in ceramics with the nominal compositions of CaCu3-xLa2x/3Ti4O12; Applied Physics Letters 91,042905 2007; 3 Pages.
R. K. Grubbs, E. L. Venturini, P. G. Clem, J. J. Richardson, B. A. Tuttle, and G. A. Samara; Dielectric and magnetic properties of Fe- and Nb-doped CaCu3Ti4O12; Physical Review B 72, 104111, 2005; 11 Pages.
Hongtao Yu, Hanxing Liu, Hua Hao, Dabing Luo, Minghe Cao; Dielectric properties of CaCu3Ti4O12 ceramics modified by SrTiO3; Science Direct; Materials Letters 62 (2008) 1353-1355.
Ruxing Li, Jinrong Cheng, Zhongyan Meng, Wenbiao Wu; Low dielectric loss and enhanced tunable properties of Cr-doped barium strontium titanate solid solution; J Mater Sci: Mater Electron (2006) 17: 587-591.
Seunghwa Kwon, Chien-Chih Huang, Eric A. Patterson, David P. Cann, Edward F. Alberta, Seongtae Kwon, Wesley S. Hackenberger, David P. Cann; The effect of Cr2O3, Nb2O5 and ZrO2 doping on the dielectric properties of CaCu3Ti4O12; Science Direct; Materials Letters 62 (2008) 633-636.
Guozhong Zang, Jialiang Zhang, Peng Zheng, Jinfengwang and Chunlei Wang; Grain boundary effect on the dielectric properties of CaCu3Ti4O12 ceramics; Journal of Physics D: Applied Physics; 38 (2005) 1824-1827.
Jinshu Wang, Shu Yin, Masakazu Komatsu, Qiwu Zhang, Fumio Saito, Tsugio Sato; Preparation and characterization of nitrogen doped SrTiO3 photocatalyst; Science Direct; Journal of Photochemistry and Photobiology A: Chemistry 165 (2004) 149-156.
Rainer Schmidt and Derek C. Sinclair; Anomalous Increase of Dielectric Permittivity in Sr-Doped CCTO Ceramics Ca1-xSrxCu3Ti4O12 (0 ex e 0.2); Chemistry of Materials Communication; vol. XXX, No. XX, XXXX; 3 Pages, 2009.
Adnan Kutubuddin Bohori, James William Bray, Somakumar Ramachandrapanicker, Suma Memana Narayana Bhat; Contactless Power Transfer System and Method; U.S. Appl. No. 12/731,497, filed Mar. 25, 2010; 29 Pages.
Search Report from corresponding EP Application No. 11165079.2-2208 dated Oct. 14, 2011.
Search Report from corresponding EP Application No. 11165080.0-2208 dated Oct. 14, 2011.
Sung-Woo et al., "Effect of Al Doping on the Electric and Dielectric Properties of CaCu 3 Ti 4 0 12", Journal of the American Ceramic Society, vol. 90, No. 12, pp. 4008-4011, Sep. 21, 2007.
Gao et al., "Surface chemical composition and optical properties of nitrogen-doped Ba0.6Sr0.4TiO3 thin films", Journal of Applied Physics, American Institute of Physics, vol. 102, No. 6, pp. 64106-64106, Sep. 26, 2007.
Shengwen et al., "The Dielectric Properties of Ba0.6Sr0.4CrxTi1-xO3Thin Films Prepared by Pulsed Laser Deposition", IEEE Transactions on Ultrasonics, Ferroelectrics and Frequency Control, IEEE, vol. 53, No. 5, pp. 1029-1033, May 1, 2008.
Mazni, "AC Conductivity of Ca1-xAxCu3Ti4O12 (A=Sr or Ba) with x=0.0 and 0.2. Ceramics", vol. 17, No. 1, pp. 222-228, 2009.
Li et al., "Enhanced dielectric properties and sinterability of CaCu3Ti4O12 ceramics by Sr<2+> doping", Physica B. Condensed Matter, vol. 405, No. 4, pp. 1193-1196, Feb. 15, 2010.
An anion substitution route to low loss colossal dielectric CaCu3Ti4O12, J. Sol. St. Chem. 182, 409, 2009.
Dielectric Properties of Bismuth Doped BST/MT Composites Zhou Hongqing et al, Piezoelectricity and Acousto-optic, Issue 6, vol. 27, pp. 668-670, 687, Dec. 2005.
S.B. Herner et al., "The effect of various dopants on the dielectric properties of barium strontium titanate", Oct. 16, 1992.
Manoj et al., "Effect of dopants on the low temperature microwave dielectric properties of Ba(Zn1/3Ta2/3)O3 ceramics", Nov. 2, 2006.

(56) References Cited

OTHER PUBLICATIONS

L.B. Kong et al., "Electrically tunable dielectric materials and strategies to improve their performances", 2010.

Kalaga Murali Krishna et al., "Dielectric Materials for Power Transfer System"; U.S. Appl. No. 12/778,166; Filed on May 12th 2010; 40 pages.

Kalaga Murali Krishna et al., "Dielectric Materials for Power Transfer System"; U.S. Appl. No. 12/778,189; Filed on May 12th 2010; 40 pages.

Unofficial Manual Translation of Chinese Office Action issued in connection with CN Application No. 201110134150.8 on Apr. 2, 2014.

Hu et al., "Study on dielectric and tunable properties of Cr-doped $Ba_{0.6}Sr_{0.4}TiO_3$ thin films by rf sputtering", Journal of Material Science (2008) 43; pp. 3162-3165.

Yu et al., "The Dielectric properties of $Ba_{0.6}Sr_{0.4}Cr_xTi_{1-x}O_3$ Thin Films Prepared by Pulsed Laser Deposition", IEEE transactions on ultrasonics, ferroelectrics, and frequency control, vol. 55, No. 5, May 2008, pp. 1029-1033.

Qin et al., "Dielectric Properties of $Cr_2O_3$ Doped (Ba, Sr, Ca) $TiO_3$ Ceramics for Tunable Microwave Devices", 0966-T10-12; MRS Symp 2007, pp. 1-:7.

Unofficial English Translation of Japanese Office Action issued in connection with corresponding JP Application No. 2011-103929 on Feb. 3, 2015.

Cao et al., "Application of Polymer/Inorganic Composite in Dielectric Materials", pp. 68-73, 2003.

Unofficial English translation of Office Action issued in connection with corresponding CN Application no. 201110134191.7 on Apr. 2, 2014.

Japanese Notice of Allowance issued in connection with corresponding JP Application No. 2011-103929 on Aug. 25, 2015.

* cited by examiner

DIELECTRIC MATERIALS FOR POWER TRANSFER SYSTEM

CROSS REFERENCE TO RELATED APPLICATIONS

This application is related to co-pending U.S. patent application Ser. No. 12/778,189, entitled "DIELECTRIC MATERIALS FOR POWER TRANSFER SYSTEM" filed contemporaneously herewith, which application is hereby incorporated by reference.

BACKGROUND

The invention relates generally to power transfer systems, and, in particular, to resonance based contactless power transfer systems.

In certain applications where instantaneous or continuous energy transfer is needed but interconnecting wires are inconvenient, contactless power transfer is desirable. One contactless power transfer method is an electromagnetic induction method that works on the principle of a primary transformer coil generating a dominant magnetic field and a secondary transformer coil in the vicinity of the primary transformer coil generating a corresponding voltage. The magnetic field received by the secondary transformer coil decreases as a function of the square of the distance between the two coils, and hence the coupling between primary and secondary coils is weak for distances greater than a few millimeters.

Another method of contactless power transfer attempts to increase the efficiency of the inductive power transfer by resonant inductive coupling. Transmitter and receiver elements resonate at the same frequency, and maximum induction occurs at the resonant frequency. However, such resonant induction is sensitive to load and gap variations.

There is a need for an efficient contactless power transfer system that may operate with coils separated by longer distances than are presently acceptable and is efficient when subjected to misalignment or load variations. Further, there is a need for accommodating and efficient materials, having high dielectric properties and low dielectric loss factors, that can be used in the power transfer systems in the required frequency ranges.

BRIEF DESCRIPTION

Briefly, in one embodiment, a power transfer system is provided. The power transfer system comprises a field-focusing element comprising a dielectric material. The dielectric material comprises a composition with the formula $Ca_{1-x-y}Ba_xSr_yTi_{1-z}Cr_zO_{3-\delta}N_p$, wherein x and y can vary between the value of zero and one such that $0<x<1$ and $0<y<1$; z can vary between the value of zero and 0.01 such that $0\leq z\leq 0.01$; and $\delta$ and p can vary between the value of zero and one such that $0\leq\delta\leq 1$ and $0\leq p\leq 1$.

In one embodiment, a power transfer system is provided. The power transfer system comprises a first coil coupled to a power source and a second coil coupled to a load; and a field-focusing element comprising a dielectric material and disposed between the first coil and the second coil. The dielectric material comprises a composition with the formula $Ca_{1-x-y}Ba_xSr_yTi_{1-z}Cr_zO_{3-\delta}N_p$, wherein x and y can vary between the value of zero and one such that $0<x<1$ and $0<y<1$; z can vary between the value of zero and 0.01 such that $0\leq z\leq 0.01$; and $\delta$ and p can vary between the value of zero and 0.5 such that $0\leq\delta\leq 0.5$ and $0\leq p\leq 0.5$.

In another embodiment, a power transfer system is provided. The power transfer system comprises a field-focusing element comprising a dielectric material. The dielectric material comprises $Ca_{1-x-y}Ba_xSr_y(Ca_{1-z}Cu_z)Cu_2Ti_{4-\delta}Al_\delta O_{1-0.5\delta}$, wherein x and y can vary between the value of zero and 0.5 such that $0\leq x<0.5$ and $0\leq y<0.5$, z can vary between the value of zero and one such that $0\leq z\leq 1$; and $\delta$ can vary between the value of zero and 0.1 such that $0\leq\delta\leq 0.1$.

In one embodiment, a power transfer system is provided. The power transfer system comprises a first coil coupled to a power source and, a second coil coupled to a load, and a field-focusing element disposed between the first coil and the second coil. The field-focusing element comprises a dielectric material such that the dielectric material comprises $Ca_{1-x-y}Ba_xSr_yCu_3Ti_4O_{12}$, wherein x and y can vary between the value of zero and 0.2 such that $0<x<0.2$ and $0<y<0.2$.

In one embodiment, a power transfer system is provided. The power transfer system comprises a first coil coupled to a power source, a second coil coupled to a load, and a field-focusing element disposed between the first coil and the second coil. The field-focusing element comprises a dielectric material, wherein the dielectric material comprises $Ca_{2-x-y}Ba_xSr_yCu_2Ti_{4-\delta}Al_\delta O_{12-0.5\delta}$, wherein x and y can vary between the value of zero and 0.2 such that $0\leq x<0.2$ and $0\leq y<0.2$ and $\delta$ can vary between the value of zero and 0.1 such that $0<\delta\leq 0.1$.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include power transfer systems and the dielectric materials that can be used for power transfer systems.

In the following specification and the claims that follow, the singular forms "a", "an" and "the" include plural referents unless the context clearly dictates otherwise.

Contactless power transfer systems are typically characterized by short distance power transfer between primary and secondary coils. For example, one embodiment of an inductive power transfer system uses a primary coil and a secondary coil to transfer power between two circuits in galvanic isolation. A magnetic field is established around the primary coil when coupled to a power source. The quantity of power transferred from the primary coil to the secondary coil is proportional to the level of primary magnetic field linking the secondary coil. Electrical transformers use high permeability magnetic cores to link the magnetic field between primary and secondary coils and thus achieve efficiencies on the order of at least about 98%. However, when such systems are configured for contactless power transfer, the air gap between the two coils reduces the magnetic field coupling. Such reduced coupling affects efficiency of contactless power transfer systems.

Certain embodiments disclosed herein provide a robust contactless power transfer system with reduced sensitivity to load variations, efficient power transfer during misalignment of coils, and a field-focusing structure that enhances power transfer efficiency.

Figure 1:
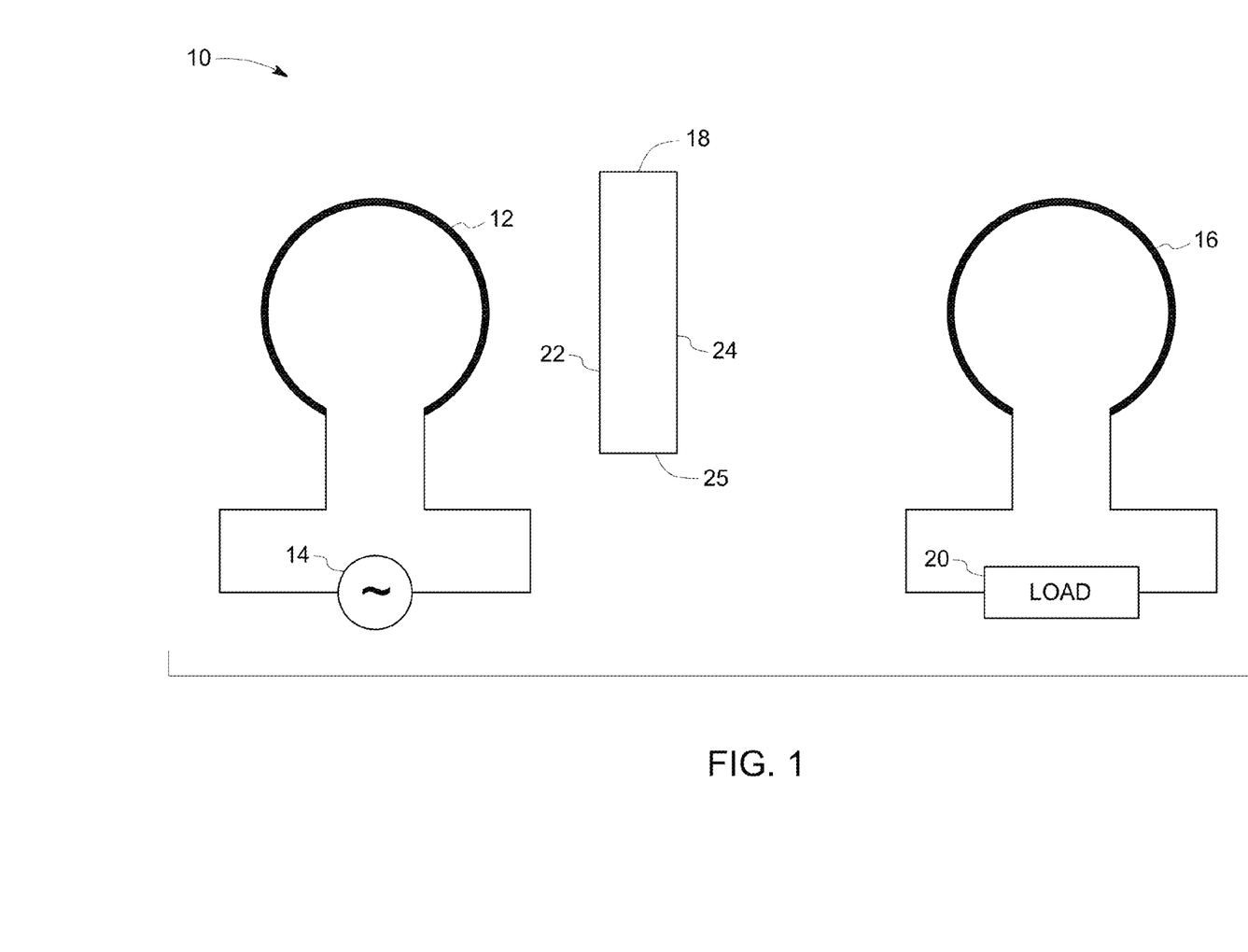
FIG. 1 illustrates an exemplary contactless power transfer system according to an embodiment of the invention.

FIG. 1 illustrates an example of a contactless power transfer system 10 according to an embodiment of the invention including a first coil 12 coupled to a power source 14 and configured to produce a magnetic field (not shown). A second coil 16 is configured to receive power from the first coil 12. As used herein, the term "first coil" may also be referred to as a "primary coil," and the term "second coil" may also be referred to as a "secondary coil." The primary and secondary coils can be made up of any good electrical conducting materials such as, for example, copper. Field-focusing element 18 is disposed between the first coil 12 and the second coil 16 for focusing the magnetic field from power source 14. In another embodiment, the field-focusing element may be used to focus electric fields and/or electro-magnetic fields. The terms "magnetic field-focusing element" and "field-focusing element" are used interchangeably. In one embodiment, magnetic field-focusing element 18 is configured as a self-resonant coil and has a standing wave current distribution when excited via the first coil. In another embodiment, the magnetic field-focusing element includes multiple resonators operating as an active array or a passive array and each resonator configured as a self-resonant coil with a standing wave current distribution. In yet another embodiment, the magnetic field-focusing element includes multiple sets of such resonators, each such resonator set excited at a particular phase. It may be appreciated that, when exciting the sets of resonators via different phases, field-focusing may be enhanced in a desired direction.

Magnetic field-focusing element 18 is further configured to focus the magnetic field onto the second coil 16 enhancing the coupling between the first coil 12 and the second coil 16. In one embodiment, a non-uniform magnetic field distribution is developed around magnetic field-focusing element 18 by creating a standing wave current distribution in the field-focusing element 18. In the illustrated embodiment, field-focusing element 18 is placed closer to the first coil 12 as an example. It may be advantageous in certain systems to place the field-focusing element 18 closer to the second coil 16. A load 20 is coupled to the second coil 16 to utilize the power transferred from the power source 14. In certain embodiments, the contactless power transfer system 10 may also be configured to simultaneously transfer power from the second coil to the first coil such that the system is capable of bidirectional power transfer. Non-limiting examples of potential loads include a bulb, a battery, a computer, a sensor, or any device that requires electrical power for operation.

The contactless power transfer system 10 may be used to transfer power from the power source 14 to the load 20. In one embodiment, the power source 14 comprises a single-phase AC power generator or three-phase AC power generator in combination with power conversion electronics to convert the AC power to a higher frequency. When the first coil 12 is excited at the resonant frequency of magnetic field-focusing element 18, a standing wave current distribution is developed within the magnetic field-focusing element 18 between two open ends (22, 24) of the field-focusing element. The standing wave current distribution leads to a non-uniform magnetic field distribution around magnetic field-focusing element 18. Such non-uniform current distribution is configured to focus magnetic field in any desired direction, such as, in a direction of the second coil 16 in this example. When operating at resonant frequency, even a small excitation to magnetic field-focusing element 18 produces a large amplitude of current distribution along the length 25 of the magnetic field-focusing element. This large current magnitude of non-uniform distribution leads to an amplified and focused magnetic field in the direction of second coil 16 that results in higher efficiency of power transfer.

Figure 2:
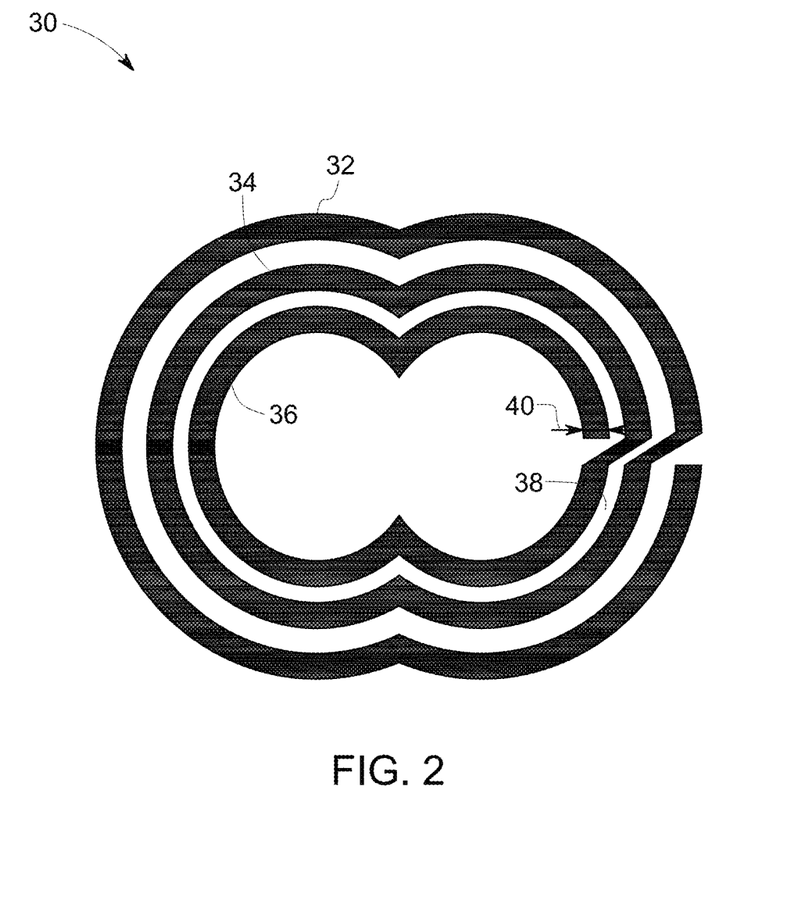
FIG. 2 illustrates an exemplary field-focusing element according to an embodiment of the invention.

FIG. 2 illustrates an example of a field-focusing element according to an embodiment of the invention. Among the various structures that may be implemented as the magnetic field-focusing element 18 in FIG. 1, one such structure is illustrated in FIG. 2. In the illustrated embodiment, the reference numeral 30 is a field-focusing structure herein referenced as an "Omega structure" and operates in a range of a few megahertz. The "Omega structure" enables high capacitance and inductance and also enables negative permeability at near resonant frequency. Negative permeability helps with dominant field response and is effective in controlling the magnetic field. Resonant frequency of such structures can be controlled by varying the number of turns (32, 34, 36), the gap between the turns (38), and the width of the spiral (40). With an increased perimeter as compared to a spiral structure, the "omega structure" requires reduced structural size to operate at lower resonance frequency.

Figure 3:
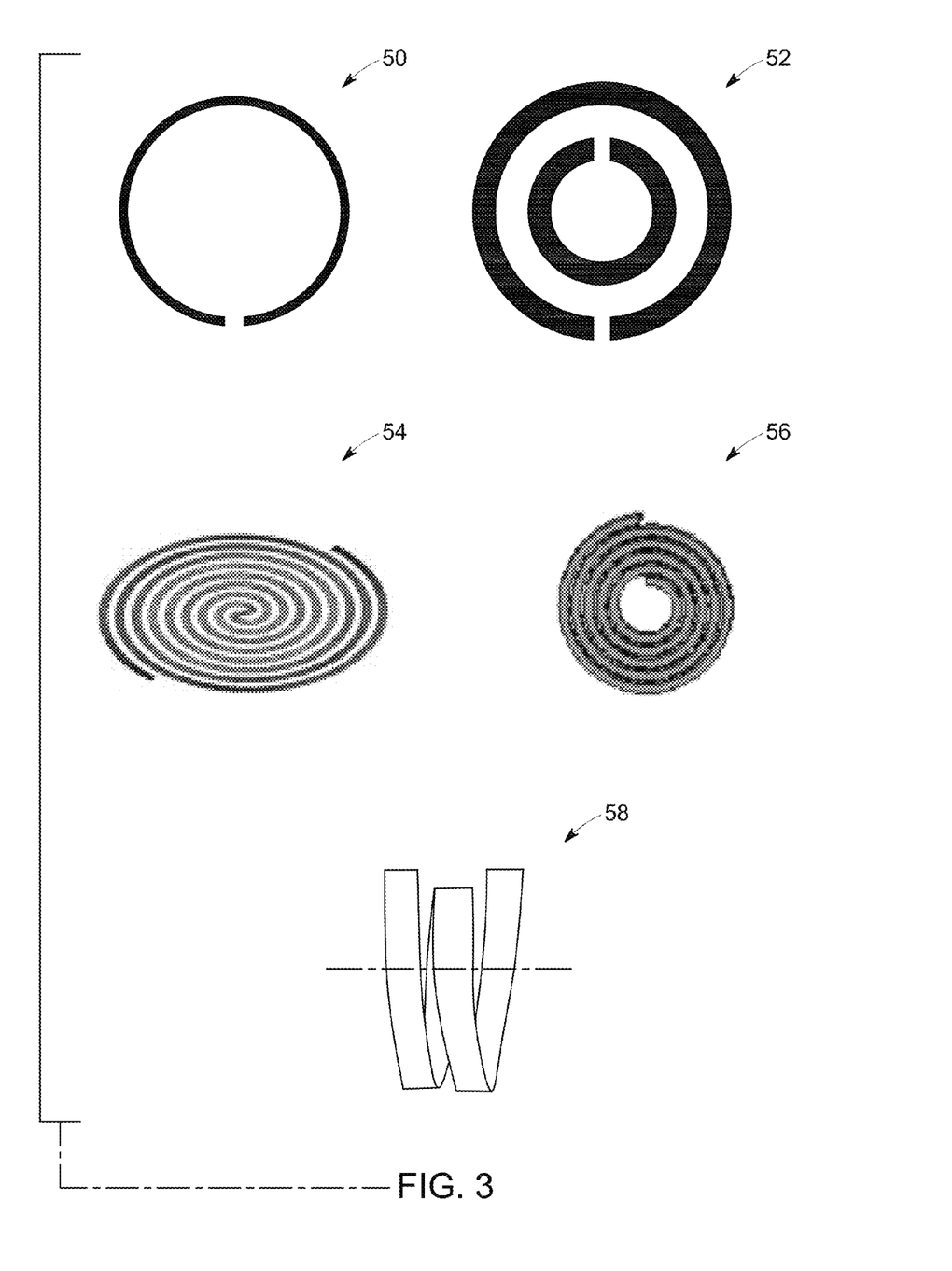
FIG. 3 illustrates multiple exemplary structures of field-focusing elements according to various embodiments of the invention.

FIG. 3 illustrates multiple examples of structures for field-focusing elements according to various embodiments of the invention. In one embodiment, the field-focusing element includes a single loop coil 50. In another embodiment, the field-focusing element includes multiple turns such as in a split ring structure 52, spiral structure 54, Swiss-roll structure 56, or helical coil 58. Selection of a structure for a particular application is determined by the size and self-resonating frequency of the field-focusing element. For example, in low power applications (less than about 1 Watt, for example), a resonance frequency up to about 1000 MHz is feasible. In high power applications (from about one hundred Watts to about 500 kilowatts, for example), the resonance frequency of the order of several hundred kHz is feasible.

Figure 4:
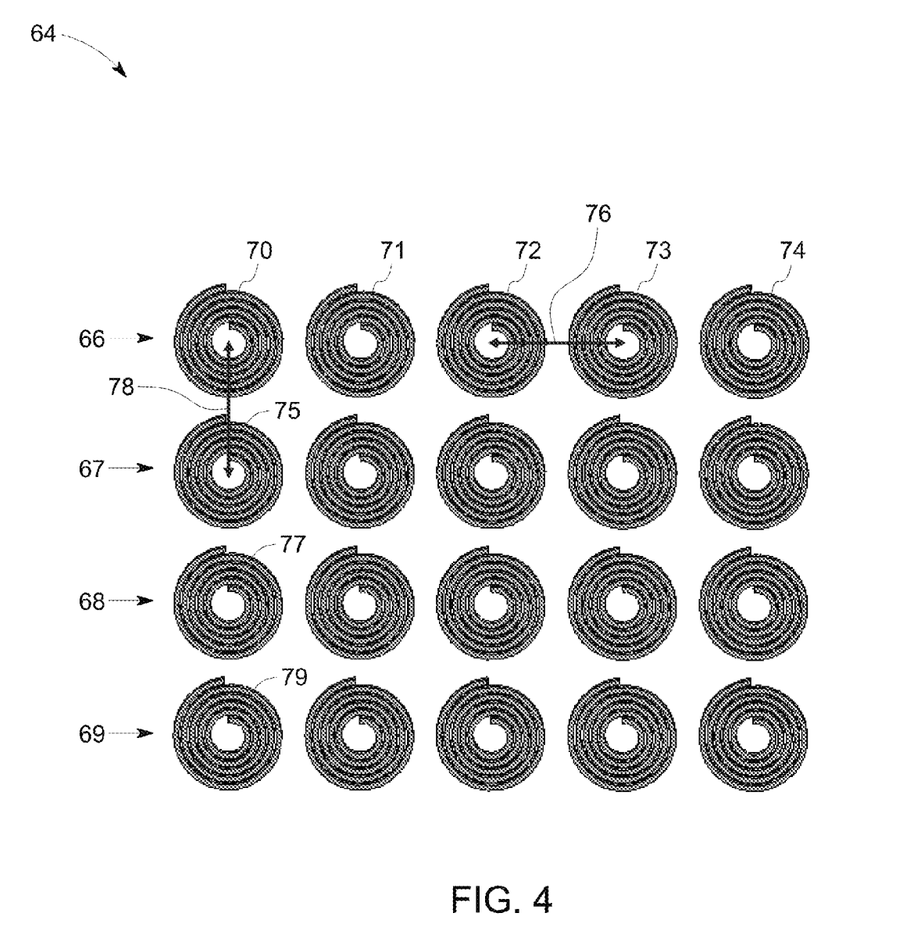
FIG. 4 illustrates an embodiment wherein a plurality of resonators are arranged in an array and implemented as a field-focusing element.

FIG. 4 illustrates an embodiment wherein a plurality of resonators are arranged in an array and implemented as a field-focusing element. An array of resonators constitutes multiple resonator coils arranged in a particular array arrangement, such as a linear or planar array, that is excited with a specific phase relationship. Individual resonators (66-77) or sub-wavelength resonators are configured to focus the magnetic field in a desired direction. In such an arrangement, fields from resonators in the array interfere constructively (add) in a desired direction to achieve magnetic field-focusing and interfere destructively (cancel each other) in the remaining space. In another embodiment, the resonators are arranged in at least one of a linear, a circular, a planar, or a three-dimensional array. In the illustrated embodiment, individual resonators 70-74 are arranged in a row and four such rows 66-69 are arranged one below the other. Individual resonators that are part of the array 64 are collectively configured for at least one or more resonant frequencies. In a particular embodiment, all of the individual resonators of the array are identical within the normal scope of variation expected for manufacturing and other common sources of variation.

In one embodiment of the power transfer system of the present invention, the resonator of the field-focusing element 18 can be made of dielectric materials in the form of, for example, dielectric cavity resonators. The dielectric materials used in field-focusing element desirably have high dielectric constant (dielectric permittivity, ∈) and low loss tangent. The high dielectric constant helps in achieving the low frequency of resonance with given smaller dimensions of resonator while the low loss tangent is desirable to keep the dielectric losses within acceptable limits.

In one embodiment, the field-focusing element 18 comprises a self-resonant coil that focuses the magnetic field upon excitation at the resonant frequency. The resonator is self-resonant coil of any shape whose self-resonant frequency depends upon the self-capacitance and self-inductance. The self-resonant frequency of the coil is dependant on the coil geometrical parameters. For example, in the case of helical resonator coil, the resonance frequency is such that the overall length of the helix is half wavelength or multiples of half wavelength of electromagnetic excitation. As a result, design of these resonators at low frequencies is challenging due to the space constraints. One of the methods to miniaturize the size of resonators is to embed the resonator in a high dielectric constant medium.

In one embodiment, a resonator or an array of resonators of the field-focusing element 18 is embedded in a material having high dielectric constant or a magnetic material having high permeability or magneto-dielectric medium having high dielectric permittivity and high magnetic permeability to achieve lower resonant frequency with a smaller sized resonator. High permeability material enhances self-inductance of the resonator and high permittivity material enhances self-capacitance of the resonators to reduce the frequency of resonance. In another embodiment, high permeability materials are also configured to increase the coupling between the primary coil and the field-focusing element, and between the field-focusing element and the secondary coil. The high dielectric constant of the embedding material helps in decreasing the operational frequency range of the resonators. The effect of dielectric constant in the frequency reduction is presented in Table 1.

TABLE 1

| Dielectric constant | Frequency kHz |
|---|---|
| 1 | 40600 |
| 1000 | 1380 |
| 10000 | 420 |
| 100000 | 132 |

When the resonator is embedded in dielectric medium the inter-turn capacitance between the turns of the coil increases which in turn helps to reduce the resonant frequency of the resonator. With high dielectric constant, size reduction of the resonator is possible to a great extent. Another advantage of high dielectric constant is the confinement of electric field within the resonator, improving the efficiency of power transfer as the radiation losses are diminished. But one of the critical design criteria of the selection of material with high dielectric constant is the loss tangent of that material at the operating frequency. The low dielectric loss tangent ensures the maximum coupling efficiency. If the loss tangent is high, the loss in the form of heat will be high in the resonator. The issue of heat loss is of importance when the power levels are high. For low power levels, the high loss tangent values are acceptable. A high dielectric constant and extremely low loss tangent dielectric material is desirable in application where the power levels are more than one kW. The high dielectric constant helps to achieve miniaturized resonators at frequencies of hundreds of kHz and the low loss tangent helps to reduce the losses in the dielectric.

Power transfer systems enabled through high dielectric constant and low loss tangent materials have applications including electric vehicles charger, power transfer to rotating load, contactless charging of mining vehicles, where the power transfer levels are on the order of a few kW. Power transfer systems having high dielectric constant and high loss dielectric materials can be used in applications like subsea connectors, where the power levels are few milliwatts.

Figure 5:
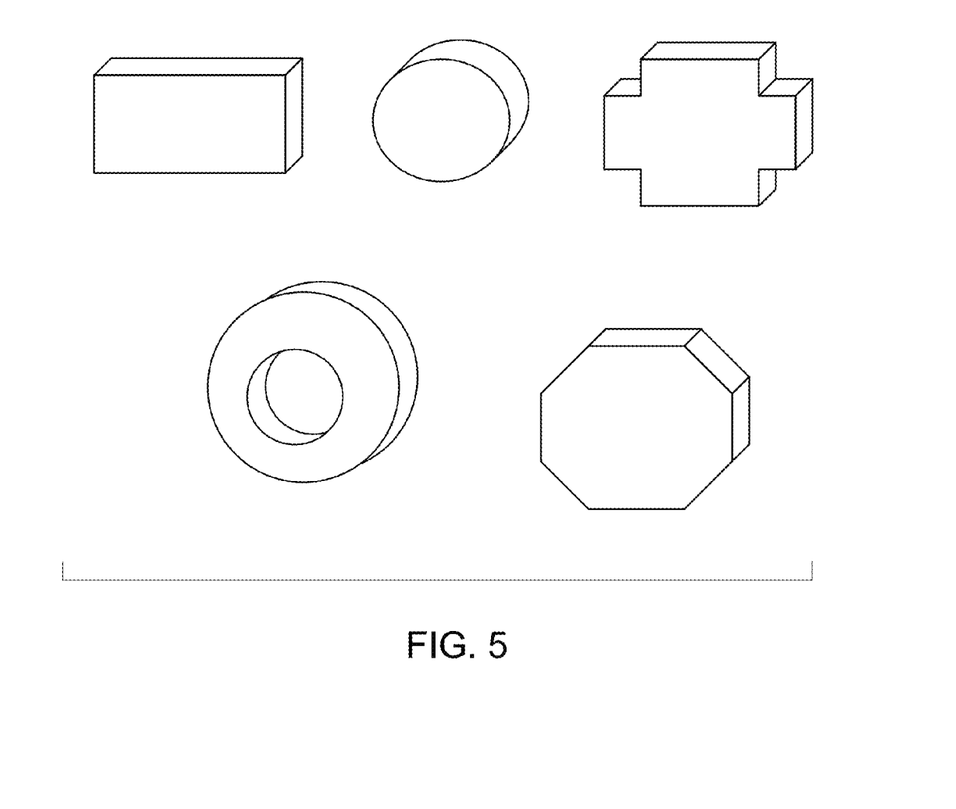
FIG. 5 illustrates multiple exemplary structures of embedding materials according to an embodiment of the invention.

High dielectric constant materials with different shapes can act as field-focusing elements. For example, a high dielectric constant circular dielectric disc can act as a resonator at certain frequencies. The resonant frequency in this case is determined by the geometrical configuration of the resonator. Non limiting examples of the different shapes of the resonators that can be used as field-focusing elements are given in FIG. 5. Field-focusing element 18 can be stacked as multi-layer resonators to yield multiple resonant frequencies. This kind of configuration helps for multidirectional power transfer in which one of the channels can be used for power transfer and other channels can be used for low power data transmission between different devices.

The high dielectric constant material can also be used as a thin film or thick film coating on a metal surface to create field focusing structures like swiss roll structure 56. The high dielectric constant between the different layers of the swiss roll increases the capacitance of the structure and thereby reducing the frequency considerably.

Materials such as, but not limited to, calcium copper titanate and barium strontium titanate are examples of materials exhibiting high dielectric constant. In one embodiment, the dielectric material is used as a bulk material. The term "bulk material" as used herein indicates any material that has a three dimensional structure with all of the sides greater than about 1 mm. In one embodiment, the dielectric materials are used as coatings. The coating can be in a thin film form or in a thick film form. As used herein a "thin film" has a thickness less than about 100 microns, while a thick film can have thickness from about a hundred microns to about a millimeter.

In one embodiment, a combination of materials can be used for embedding the resonators. For example, a mixture of two or more materials having high dielectric constant or two or more materials having high permeability can be used as the embedding material. In another embodiment, a mixture of two or more materials, each having a high dielectric constant or a high permeability can be used as the embedding material.

Barium strontium titanate—$(Ba, Sr)TiO_3$— and calcium copper titanate—$CaCu_3Ti_4O_{12}$— have different crystal structures and exhibit different temperature dependent characteristics. For example, $(Ba, Sr)TiO_3$ belongs to a perovskite family and is a ferroelectric material with a cubic to tetragonal crystal structure transition around the temperature of about 120° C. $CaCu_3Ti_4O_{12}$ is not a ferroelectric material and has a body centered cubic (b.c.c) structure. The factors influencing the dielectric properties such as dielectric constant and dielectric loss tangent in the $(Ba, Sr)TiO_3$ and $CaCu_3Ti_4O_{12}$ systems may also be different. For example, it is believed that the generation and ordering of dipoles is a reason for the ferroelectricity and the high dielectric constant in the $(Ba, Sr)TiO_3$ system, while the $CaCu_3Ti_4O_{12}$ system is thought to have the effects arising from barrier layer capacitance by having insulating grain boundaries and semi conducting grains.

In one embodiment, it is desirable to use dielectric materials whose dielectric properties such as dielectric constant and loss tangent are substantially stable over a certain frequency range of the desired applications. The term "substantially stable" herein means that the change in values does not lead to more than about 10% of the performance variation of the power transfer system. Thus, the required value and width of the frequency ranges may vary depending on the applications for which the field-focusing element is used. In one embodiment, the desired frequency range is from about 100 Hz to about 100 MHz. In some embodiments, the desired frequency range is from about 1 kHz to about 100 kHz. In another embodiment, the desired frequency range is from about 100 kHz to about 1 MHz. In one more embodiment, the desired frequency range is from about 1 MHZ to about 5 MHz.

Materials having a low dielectric loss tangent along with high dielectric constant will function efficiently in enhancing the self-capacitance of the resonators when used as the embedding materials or cavity resonators, compared to materials that have low dielectric constant and high loss tangent. Therefore, materials that have both high dielectric constant and low dielectric loss tangent at the frequency of operation of the resonators are desirable to be used in the field-focusing element 18.

A dielectric material to be used in a field-focusing element 18 of the power transfer system would generally require a high dielectric constant that is equal to or greater than about 100 and a loss tangent that is as low as possible. In one embodiment, a loss tangent equal to or less than about 0.1 may be acceptable for a dielectric material to be used in field-focusing element. In a subsequent embodiment, a loss tangent equal to or less than about 0.01 is desirable for the dielectric material.

The inventors studied different ways of improving the desirable dielectric properties of the dielectric materials belonging to the $(Ba, Sr)TiO_3$ and $CaCu_3Ti_4O_{12}$ systems. The different methods investigated for the property enhancements include, but are not limited to, cation doping, anion doping, grain boundary doping, density increment, composite formations, and changing the sintering conditions, sintering atmospheres, and structural and microstructural aspects.

Accordingly, in one embodiment, a material system with the formula $Ca_{1-x-y}Ba_xSr_yTi_{1-z}Cr_zO_{3-\delta}N_p$ wherein $0<x<1$; $0<y<1$; $0\leq z\leq 0.01$; $0\leq \delta \leq 1$; and $0\leq p\leq 1$ is provided for use in, for example, the field-focusing element 18 of the power transfer system described above. This system will be henceforward referred to as "BST material system" for simplicity. As used herein, the term 'greater than zero' denotes that the intended component is intentionally added, rather than an incidental amount that may be present as an impurity. As used herein, end points of the ranges include incidental variations above and below the stated number, as appropriate for normal measurement and process variations. In one embodiment, a power transfer system is presented comprising BST material system as a dielectric material.

In one embodiment, a material system with the formula $Ca_{1-x-y}Ba_xSr_y$ $(Ca_{1-z}Cu_z)$ $Cu_2Ti_{4-\delta}Al_\delta O_{12-0.5\delta}$ wherein $0\leq x<0.5$, $0\leq y<0.5$; $0\leq z\leq 1$; and $0\leq \delta \leq 0.1$ is presented for use in, for example, the field-focusing element 18 of the power transfer system described above. This system will be henceforward referred to as "CCT material system" for simplicity. As used herein in the CCT material system, the formula $Ca_{1-x-y}Ba_xSr_y$ $(Ca_{1-z}Cu_z)$ $Cu_2Ti_{4-\delta}Al_\delta O_{12-0.5\delta}$ is a theoretical formula including the mixtures and compounds that are in the specified ratio to be denoted by this formula, and does not necessarily mean that a single compound exists in a form that can be identified by standard characterization techniques. In short, a material specified by the above formula may actually exist as multiple phases which, taken collectively, have an overall composition as specified by the formula. In one embodiment, a power transfer system is presented comprising CCT material system as a dielectric material.

In general, the cation dopants were found to increase resistance of the grain boundary by absorbing the oxygen vacancies and thereby decrease both the dielectric constant and loss tangent. By doping at the cation site, the doped cation gets reduced by absorbing the electron density at the grain boundary, thereby decreasing the conduction of the grain boundary, thus leading to the decrease in dielectric constant and loss.

In general, by doping at the anion site, the cation of the lattice gets reduced by absorbing the electron density thereby creating insulating planar defects in the grains. The insulating planar defects can reduce the electrical resistivity of internal barrier of the grains and thereby decrease the dielectric loss.

In the BST material system, the barium and strontium levels were varied and studied for their effects on favorable dielectric properties. Thus, in one embodiment, a power transfer system comprising a BST material system is provided such that $0.3\leq x$. Therefore, in this embodiment, the barium level is equal to or greater than about 0.3. In a further embodiment, $x+y=1$. Therefore, in this embodiment the BST material system does not contain any other dopants in the barium or strontium sites. In one embodiment, the strontium level in the BST material system is such that $0.4\leq y<1$. Therefore, in this embodiment, the strontium level is always equal to or greater than about 0.4. Examples of the above BST material systems include, but are not limited to, $Ba_{0.3}Sr_{0.7}TiO_3$ and $Ba_{0.4}Sr_{0.6}TiO_3$.

In one embodiment of the power transfer system with a BST material system, the barium or strontium of the BST material system is partially replaced by cations such as calcium to enhance favorable dielectric properties. In one embodiment, a BST material system is such that $0.9\leq x+y<1$. Thus, in this embodiment, the BST material system contains another dopant in the barium or strontium sites, but the value of the dopant is always equal to or less than about 0.1. Examples of the above BST material systems include, but are not limited to, $Ba_{0.55}Sr_{0.40}Ca_{0.05}TiO_3$ and $Ba_{0.5}Sr_{0.4}Ca_{0.1}TiO_3$.

In one embodiment of the power transfer system with a BST material system, the titanium is partially replaced by chromium, which may help to decrease the loss tangent. In one embodiment, the chromium is substituted for less than about 2 atomic % of titanium in the BST material system. In a subsequent embodiment, the chromium substitution is in the range of about 0.01 atomic % to about 1 atomic %. Thus, in this embodiment, the quantity z in the formula above varies between about 0.0001 and about 0.01. In a further embodiment, the chromium substitution is in the range of about 0.2 atomic % to about 1 atomic % of titanium with the z value varying between about 0.002 and about 0.01. In one embodiment, in a BST material system, $z>0$, and $\delta$ and p are both equal to 0. In this embodiment, the BST material system comprises cation substitutions, but not anion substitutions. Examples of the above BST material systems include, but are not limited to, $Ba_{0.3}Sr_{0.7}Cr_{0.002}Ti_{0.998}O_3$. In a BST system, when titanium is substituted with a trivalent cation, such as chromium in the above example, the oxygen level can also stoichiometrically change. For instance in the above example, the number of oxygen atoms can be 2.999, instead of 3, to accommodate substitution of 0.002 atoms of chromium. In a further embodiment, in the BST material system, the barium or strontium is partially replaced by cations such as calcium or lanthanum; and titanium is partially replaced by chromium. Examples of the above BST material systems include, but are not limited to, $Ba_{0.55}Sr_{0.4}Ca_{0.5}Cr_{0.002}Ti_{0.998}O_3$. Table 2 below represents some examples of the BST material systems and their dielectric properties with the varying levels of barium and strontium and with some cation dopants.

TABLE 2

| BST material system | Frequency | Dielectric constant | Loss tangent |
|---|---|---|---|
| $Ba_{0.3}Sr_{0.7}TiO_3$ | 10 kHz-1 MHz | >640 | ~0.01 |
| | ~10 kHz | ~645 | ~0.006 |
| $Ba_{0.4}Sr_{0.6}TiO_3$ | 10 kHz-10 MHz | >480 | <0.02 |
| | ~2.3 MHz | >480 | <0.0002 |
| $Ba_{0.4}Sr_{0.6}Cr_{0.002}Ti_{0.998}O_3$ | 1 kHz-1 MHz | >740 | <0.09 |
| | ~339 kHz | >740 | ~0.0004 |
| $Ba_{0.4}Sr_{0.6}Cr_{0.005}Ti_{0.995}O_3$ | 1 kHz-1 MHz | >910 | <0.009 |
| | ~660 kHz | >910 | <0.0002 |

In one embodiment of the power transfer system with a BST material system, the oxygen is partially replaced by nitrogen via anion doping. Nitrogen and fluorine are two examples of anion dopants used to substitute for oxygen. In one embodiment, the nitrogen is substituted such that $0 \leq \delta \leq 1$; and $0 \leq p \leq 1$ in the BST material system. Therefore, in one embodiment, the anion substitution is such that about 25% or less of oxygen in the BST material system is substituted by nitrogen. In one embodiment, depending on the process conditions, the nitrogen is in an oxidation state of −3 while substituting for oxygen in the BST material system. In one embodiment, the nitrogen is substituted such that $0 \leq \delta \leq 1$ and $0 \leq p \leq 0.8$. In one embodiment, the nitrogen substitution replaces less than about 10 atomic % of oxygen in the BST material system. In one embodiment, the nitrogen is substituted such that $0.1 \leq \delta \leq 0.8$ and $0.1 \leq p \leq 0.8$. In one embodiment, the oxygen is substituted by fluorine instead of nitrogen such that $0 \leq \delta \leq 1$; and $p=0$. In a further embodiment, the oxygen is substituted by fluorine instead of nitrogen such that $0.1 \leq \delta \leq 1$; and $p=0$. In another embodiment, the oxygen is substituted by both nitrogen and fluorine in a condition such that $0.1 \leq \delta \leq 0.5$ and $0.05 \leq p \leq 0.3$.

In one embodiment of the power transfer system with a BST material system, oxygen is substituted by another anion such that $z=0$, and $\delta$ and p are both greater than 0. Thus in this embodiment, the anion substitutions are conducted in the absence of cation substitution. A BST material system with the composition $Ba_{0.3}Sr_{0.7}TiO_{2.8}N_{0.13}$ is presented as an example. The above-mentioned material shows an extremely low dielectric loss of about 0.0001 with a suitable dielectric constant of about 506 at the frequency of about 2.5 MHz.

In one embodiment of the power transfer system, the BST material system is doped with both cations and anions. In one embodiment, titanium is partially replaced by chromium and oxygen is partially replaced by nitrogen such that z, $\delta$ and p are all greater than zero. In an example, a material with the composition $Ba_{0.4}Sr_{0.6}Cr_{0.005}Ti_{0.995}O_{2.8}N_{0.13}$ is presented, which demonstrates a loss tangent of about 0.003 with a dielectric constant of about 819 at the frequency of about 3.13 MHz. In a further embodiment, $0<x+y<1$ and z, $\delta$, and p are all greater than zero such that a cationic dopant is present in the barium or strontium site, chromium partially substitutes titanium, and nitrogen partially substitutes oxygen. Table 3 provides the dielectric values of some of the anion-doped materials in the BST material system with and without cation dopants.

TABLE 3

| BST material system | Frequency | Dielectric constant | Loss tangent |
|---|---|---|---|
| $Ba_{0.3}Sr_{0.7}TiO_{2.8}N_{0.13}$ | ~1 MHz | >500 | ~0.005 |
| | ~2.5 MHz | >500 | ~0.00015 |
| $Ba_{0.3}Sr_{0.7}Cr_{0.005}Ti_{0.995}O_{2.8}N_{0.13}$ | ~1 MHz | >480 | ~0.005 |
| | ~2.7 MHz | ~470 | ~0.0004 |
| F doped $Ba_{0.4}Sr_{0.6}TiO_3$ prepared by using $BaF_2$ and $SrF_2$ as Ba and Sr source respectively | 100 Hz-10 MHz | >400 | <0.01 |
| | 1.49 MHz | ~400 | ~0.0001 |

As presented earlier, in one embodiment, a power transfer system comprising a field-focusing element 18 including a CCT material system is presented such that $Ca_{1-x-y}Ba_xSr_y$ $(Ca_{1-z}Cu_z) Cu_2Ti_{4-\delta}Al_\delta O_{12-0.5\delta}$, wherein $0 \leq x<0.5$, $0 \leq y<0.5$, $0 \leq z \leq 1$, and $0 \leq \delta \leq 0.1$. In one embodiment, the CCT material system comprises $CaCu_3Ti_4O_{12}$. In another embodiment, the CCT material system comprises $Ca_2Cu_2Ti_4O_{12}$ having a dielectric constant greater than about 3500 and a loss tangent less than about 0.07 at a frequency of about 100 kHz.

In one embodiment, in the power transfer system comprising a CCT material system, $x>0$. In another embodiment, $y>0$. In one further embodiment, $x>0$ and $y>0$. Thus, in the above embodiments, calcium is partially replaced by barium and/or strontium. One example of a CCT material system prepared with barium and strontium dopants and demonstrating very good dielectric properties is $Ba_{0.01}Sr_{0.2}Ca_{0.79}Cu_3Ti_4O_{12}$. This material has a substantially uniform dielectric constant and loss tangent values over a wide range of frequency ranges, which makes this material useful for an application that will work over a variable range of frequencies. The dielectric constant for the material $Ba_{0.01}Sr_{0.2}Ca_{0.79}Cu_3Ti_4O_{12}$ lies in the range of about 4500-5000 and the loss tangent is in the range of about 0.06 to 0.08 for the entire frequency range from about 1 kHz to about 100 kHz. The material is suitable for contactless power transmission at any frequency lying in the range of about 1 kHz to 100 kHz.

In one embodiment of the power transfer system comprising CCT material system to be used in the field-focusing element 18, x and y are both equal to zero and z=1, and the copper is partially replaced by other suitable cations such as, for example, lanthanum. In one more embodiment, the titanium is partially replaced by iron, aluminum, chromium, zirconium, or any of their combinations. In one embodiment, any or all of the above mentioned replacements coexist.

The examples presented below depict the different CCT material systems that can be used in the field-focusing element 18 presented above, along with their approximate measured dielectric constant and loss tangent values. While some particular examples are presented herein, the variations in the dopant combinations and levels will be appreciated by one skilled in the art.

One example of a CCT material system exhibiting good dielectric properties is $CaCu_3Ti_4O_{12}$. Table 4 lists some of the properties of the pure and doped $CaCu_3Ti_4O_{12}$ material.

TABLE 4

| CCT material system | Frequency | Dielectric constant | Loss tangent |
|---|---|---|---|
| $CaCu_3Ti_4O_{12}$ | 10 kHz-30 kHz | >6000 | <0.1 |
| $CaCu_{2.9}La_{0.067}Ti_{3.94}Al_{0.06}O_{11.97}$ | 10 kHz-60 kHz | >6000 | <0.1 |
| $CaCu_3Ti_{3.94}Al_{0.06}O_{11.97}$ | ~10 kHz | >14000 | ~0.11 |
| $CaCu_3Ti_{3.99}Zr_{0.01}O_{12}$ | ~10 kHz | >12000 | <0.08 |

TABLE 4-continued

| CCT material system | Frequency | Dielectric constant | Loss tangent |
|---|---|---|---|
| $CaCu_{2.9}La_{0.067}Ti_{3.98}Cr_{0.02}O_{11.99}$ | ~10 kHz | >12000 | <0.2 |
| $CaCu_3Ti_{3.98}Cr_{0.02}O_{11.99}$ | 10 kHz-100 kHz | >2000 | <0.1 |

In one embodiment, in the CCT material system of the field-focusing element 18 of the power transfer system, all of x, y, and z are equal to zero and the copper is partially replaced by other suitable cations such as, for example, lanthanum. In one more embodiment, the titanium is partially replaced by iron, aluminum, chromium, zirconium, or any of their combinations. In one embodiment, any or all of the above mentioned replacements coexist.

The examples presented below depict the different embodiments presented above for a power transfer system with a field-focusing element comprising a CCT material system, along with the approximate measured dielectric constant and loss tangent values of the materials. While some particular examples are presented herein, the variations in the dopant combinations and levels will be appreciated by the one skilled in the art.

In one embodiment, $Ca_2Cu_2Ti_4O_{12}$ is a material in the CCT material system of the field-focusing element 18 with about 33.3 mole % of $CaCu_3Ti_4O_{12}$ and about 66.7 mole % of $CaTiO_3$. This material, in the pure form and doped form exhibits some good dielectric properties as can be seen from the Table 5.

TABLE 5

| CCT material system | Frequency | Dielectric constant | Loss tangent |
|---|---|---|---|
| $Ca_2Cu_2Ti_4O_{12}$ | ~100 kHz | >3700 | <0.07 |
| $Ca_2Cu_2Ti_{3.99}Zr_{0.01}O_{11.995}$ | 100 kHz-130 kHz | >2000 | <0.08 |
| $Ca_2Cu_2Ti_{3.94}Al_{0.06}O_{11.97}$ | 3.5 kHz-10 kHz | >2000 | <0.04 |
|  | 10 kHz-100 kHz | >2000 | <0.06 |
| $Ca_2Cu_{1.9}La_{0.067}Ti_4O_{12}$ | 100 kHz-130 kHz | >1500 | <0.09 |

In one embodiment of the power transfer system, the dielectric material of the field-focusing element comprises $SrTiO_3$ along with the CCT material system. One example of this dielectric material is (0.6 $CaCu_3Ti_4O_{12}$+0.4 $SrTiO_3$). This combination has a dielectric constant value greater than about 7000 and the loss tangent value less than about 0.09 at the frequency range from about 10 kHz to about 35 kHz. Another example of this dielectric material is (0.6 $CaCu_3Ti_{3.94}Al_{0.06}O_{11.97}$+0.4 $SrTiO_3$). This combination has a dielectric constant value greater than about 9000 and the loss tangent value less than about 0.09 at the frequency range from about 1 kHz to about 10 kHz.

The inventors found that the density of materials also plays an important role in the dielectric properties of the materials. If the microstructure of the dielectric materials is dense, the materials comprise fewer air pores in the material body. Air normally has a lower dielectric constant than the dielectric materials and hence is expected to lead to an overall lower dielectric constant, when present in the material. Therefore, the inventors conducted experiments to increase overall density of the materials and thereby increase the dielectric constant. In one embodiment, different BST and CCT material systems were sintered at different high temperatures and were studied for their dielectric constant and loss tangent values. It is found that the dielectric constant increased by increasing the sintering temperatures, while the loss tangent value decreased for the high temperature sintered samples. Further, it was observed that, both in the BST and CCT materials system, a high temperature sintering at lower sintering time helped in reducing the loss tangent values compared to a lower temperature sintering with larger sintering time. For example, a BST materials system such as $Ba_{0.55}Sr_{0.4}Ca_{0.05}TiO_3$ sintered at 1440° C. for 2 hours resulted in a material with lower loss tangent values compared to the same material sintered at 1350° C. for 12 hours. Similarly, a CCT material system sintered at 1100° C. for 2 hours resulted in a material with lower loss tangent values compared to the same material sintered at 1050° C. for 12 hours.

In one embodiment of the power transfer system, the BST and CCT materials intended to be used in a field-focusing element 18 were cold isostatically pressed (CIP) before sintering to increase the density of materials. In one embodiment, the density of the BST materials obtained by CIP and eventual sintering is greater than about 80% of the theoretical density of those compositions. In one embodiment, the density is greater than about 90% of the theoretical density. In a further embodiment, the density is greater than about 96% of the theoretical density. In one more embodiment, the density is greater than about 98% of the theoretical density.

Example compositions processed by CIP include $Ba_{0.55}Sr_{0.4}Ca_{0.05}TiO_3$ and $Ba_{0.5}Sr_{0.4}Ca_{0.1}TiO_3$. Comparison of dielectric constant values for some of the example materials between normally processed samples and samples that were subjected to CIP are shown in Table 6, while Table 7 shows the comparison of loss tangent values. From the tables, it can be seen that while the increment in dielectric constant by subjecting the material to CIP prior to sintering was observed for all the materials at all the frequencies, the effect of CIP in decreasing the loss tangent values were observed for comparatively higher frequency range measurements.

TABLE 6

| BST material system | 100 Hz | 1 kHz | 10 kHz | 100 kHz | 1 MHz | 10 MHz |
|---|---|---|---|---|---|---|
| $Ba_{0.5}Sr_{0.4}Ca_{0.1}TiO_3$ (Normal) | 2167.4 | 2096.5 | 2036.9 | 1994.6 | 1960.3 | 1948.8 |
| $Ba_{0.5}Sr_{0.4}Ca_{0.1}TiO_3$ (CIP) | 2855.9 | 2692.2 | 2623.2 | 2597.6 | 2581.1 | 4281.5 |
| $Ba_{0.55}Sr_{0.4}Ca_{0.05}TiO_3$ (Normal) | 381.3 | 164.5 | 1215.7 | 1190.6 | 1146.5 | 429.1 |
| $Ba_{0.55}Sr_{0.4}Ca_{0.05}TiO_3$ (CIP) | 3156.7 | 2491.7 | 2295.2 | 2238.2 | 2208.9 | 3101.5 |

TABLE 7

| BST material system | 100 Hz | 1 kHz | 10 kHz | 100 kHz | 1 MHz | 10 MHz |
|---|---|---|---|---|---|---|
| $Ba_{0.5}Sr_{0.4}Ca_{0.1}TiO_3$ (Normal) | 0.0282 | 0.0208 | 0.0170 | 0.0127 | 0.0086 | 0.0098 |
| $Ba_{0.5}Sr_{0.4}Ca_{0.1}TiO_3$ (CIP) | 0.0560 | 0.0299 | 0.0112 | 0.0055 | 0.0027 | 0.0995 |

TABLE 7-continued

| BST material system | 100 Hz | 1 kHz | 10 kHz | 100 kHz | 1 MHz | 10 MHz |
|---|---|---|---|---|---|---|
| $Ba_{0.55}Sr_{0.4}Ca_{00.5}TiO_3$ (Normal) | 0.8883 | 8.6496 | 0.0422 | 0.0273 | 0.1237 | 2.8665 |
| $Ba_{0.55}Sr_{0.4}Ca_{00.5}TiO_3$ (CIP) | 0.2515 | 0.1169 | 0.0367 | 0.0144 | 0.0069 | 0.1617 |

However, all of the above-mentioned materials, by subjecting to CIP, showed very good dielectric constant values of greater than about 2000 and low loss tangent values of less than about 0.08 in the frequency ranges of about 10 kHZ to about 2 MHz, such that the materials are good for using in a field-focusing element 18 for a contactless power transfer application, along with being useful for other applications.

The inventors further conducted experiments on the dielectric materials by treating the materials in different atmospheres such as an oxygen-rich atmosphere, a nitrogen atmosphere, or a reducing atmosphere such as a hydrogen atmosphere, for example. An oxygen-rich atmosphere, for example, is able to effect changes in the dielectric properties of CCT and BST family materials. It is observed that in the CCT family materials, sintering in the oxygen atmosphere compensates the oxygen vacancies in the materials, thus leading to lower dielectric constant and lower loss tangent. In the BST material system, sintering in the oxygen atmosphere increases the density of materials and thus increases the dielectric constant. Sintering in nitrogen atmosphere is expected to take out some of the oxygen from the materials, thus turning the material oxygen deficient, increasing the oxygen vacancies and electron densities, and leading to high dielectric constant and increased loss tangent. Tables 8 and 9 provide the dielectric constant and loss tangent values comparison respectively, for the example materials $Ba_{0.5}Sr_{0.4}Ca_{0.1}TiO_3$ and $Ba_{0.55}Sr_{0.4}Ca_{0.05}TiO_3$ at the frequency range of about 100 Hz to about 1 MHz. Similar to the effect of high temperature sintering, the oxygen atmosphere sintering in the BST materials system was found to increase the dielectric constant, while the loss tangent values were also found to increase.

TABLE 8

| BST material system | 100 Hz | 1 kHz | 10 kHz | 100 kHz | 1 MHz |
|---|---|---|---|---|---|
| $Ba_{0.5}Sr_{0.4}Ca_{0.1}TiO_3$ (Normal) | 2855.9 | 2692.2 | 2623.2 | 2597.6 | 2581.1 |
| $Ba_{0.5}Sr_{0.4}Ca_{0.1}TiO_3$ ($O_2$ sintered) | 3780.3 | 3261.1 | 3070.8 | 2979.9 | 2925.6 |
| $Ba_{0.55}Sr_{0.4}Ca_{0.05}TiO_3$ (Normal) | 3156.7 | 2491.1 | 2295.2 | 2238.2 | 2208.9 |
| $Ba_{0.55}Sr_{0.4}Ca_{0.05}TiO_3$ ($O_2$ sintered) | 8071.6 | 4827.0 | 3648.1 | 3428.0 | 3368.3 |

TABLE 9

| BST material system | 100 Hz | 1 kHz | 10 kHz | 100 kHz | 1 MHz |
|---|---|---|---|---|---|
| $Ba_{0.5}Sr_{0.4}Ca_{0.1}TiO_3$ (Normal) | 0.0560 | 0.0299 | 0.0112 | 0.0055 | 0.0027 |
| $Ba_{0.5}Sr_{0.4}Ca_{0.1}TiO_3$ ($O_2$ sintered) | 0.1800 | 0.0770 | 0.0290 | 0.0174 | 0.0080 |
| $Ba_{0.55}Sr_{0.4}Ca_{0.05}TiO_3$ (Normal) | 0.2515 | 0.1169 | 0.0367 | 0.0144 | 0.0069 |
| $Ba_{0.55}Sr_{0.4}Ca_{0.05}TiO_3$ ($O_2$ sintered) | 1.1900 | 0.4300 | 0.1400 | 0.0320 | 0.0100 |

In one experiment, BST materials were subjected to CIP and also were sintered in oxygen atmosphere for obtaining better dielectric values. Examples include, but not limited to, $Ba_{0.55}Sr_{0.4}Ca_{0.05}TiO_3$ sintered in oxygen atmosphere at about 1440° C. for 2 hours, leading to a dielectric constant value greater than about 1900 and loss tangent value less than about 0.01 in the frequency range of about 1 MHz to about 10 MHz. Further, this material has a dielectric constant greater than about 1900 and a loss tangent value of about 0.0008 at the frequency of about 2.91 MHz. $Ba_{0.55}Sr_{0.4}Ca_{0.05}Cr_{0.01}Ti_{0.99}O_3$ sintered in oxygen atmosphere at about 1440° C. for 2 hours has a dielectric constant value greater than about 1300 and the loss tangent value less than about 0.001 in the frequency of about 4.95 kHz.

In one embodiment of the power transfer system, the dielectric materials exist in the bulk material form and are polycrystalline, with grains and grain boundaries. An increased grain boundary conduction in BST or CCT material system may increase both dielectric constant and loss tangent. For example, a metallic precipitate at the grain boundary creates electrostatic potential due to the metal and electron interface, thereby increasing grain boundary conduction and, consequently, the dielectric constant and loss tangent.

In one embodiment of the power transfer system, any of the materials described above included in the field-focusing element is doped with a bismuth-containing material, such as bismuth oxide. In a further embodiment, bismuth exists in a metallic phase in the grain boundaries of the polycrystalline materials used for field-focusing element. In a related embodiment, bismuth oxide is doped and reduced to become metallic bismuth in the grain boundaries of the dielectric material. In one embodiment, the bismuth oxide is introduced to the grain boundaries by mixing $Bi_2O_3$ and $TiO_2$ with the calcined BST powders before forming the BST materials into the bulk form incorporable to the field-focusing element 18 and sintering. In one embodiment, less than about 3 mole % of $Bi_2O_3.3TiO_2$ is present the BST material system. In one embodiment, the BST material system has a metallic bismuth phase in the grain boundaries. It is found that the dielectric constant of the BST material system increases significantly by having a metallic bismuth phase in the grain boundaries. In some instances, the increment in dielectric constant value of the BST material system by disposing metallic bismuth in the grain boundary was more than about two orders of magnitude. The material $Ba_{0.4}Sr_{0.6}TiO_3$ with 1 mole % $Bi_2O_3.3TiO_2$ doping can be considered as an example. This material demonstrates an extremely high dielectric constant, greater than about 30,800, with an extremely low loss tangent factor of about 0.001 at a frequency of about 315 kHz, and therefore is a good material for a field-focusing element of a contactless power transfer system as described herein.

In one experiment, BST material system was densified by cold isostatic pressing before sintering. In a further embodiment, the material was also doped with the bismuth oxide in the grain boundary and the bismuth oxide was reduced to metallic bismuth by reducing atmosphere treatment such as 5% hydrogen in nitrogen at about 1200° C. for about 12 hours. In one embodiment, a power transfer system comprising a field-focusing element comprising a bismuth doped BST material system is presented. The examples include the materials such as $Ba_{0.4}Sr_{0.6}Cr_{0.01}Ti_{0.99}O_3$+1 Mole % $Bi_2O_3.3TiO_2$ and $Ba_{0.4}Sr_{0.6}Cr_{0.01}Ti_{0.99}O_3$ 1 mole % $Bi_2O_3.3TiO_2$. The above-mentioned materials demonstrate extremely high dielectric constant of greater than about 11,030,000 at a frequency of about 100 Hz. However, the dielectric loss tangent of the materials have a somewhat high value of about 0.9 at a frequency of about 100 Hz. These materials may be useful in applications where a high dielectric constant is of high importance while the high loss tangent values can be accommodated such as in low power transfer applications.

In one embodiment, power transfer system with a field-focusing element comprises a BST material system that is doped with both cations and grain boundary dopants. Examples for the BST materials that had both cation doping and grain boundary doping, and that show desirable dielectric properties, include $Ba_{0.3}Sr_{0.7}Cr_{0.002}Ti_{0.998}O_3$ doped with about 1 mole % $Bi_2O_3.3TiO_2$. This material showed a dielectric constant of about 7668 with a dielectric loss of about 0.007 at about 1.4 MHz. While other applications can be envisaged, the above-mentioned material is particularly suitable for the field-focusing element in the contactless power transmission system for high power transfer described herein. Another example of a dielectric material with both cation and grain boundary doping is $Ba_{0.3}Sr_{0.7}Cr_{0.005}Ti_{0.995}O_3$ doped with about 1 mole % $Bi_2O_3.3TiO_2$. This material demonstrates a very high dielectric constant of greater than about 3,470,000 at the frequency of about 100 Hz. However, this material also has a high loss tangent value of about 1 that may limit the application of the material in the field-focusing element for high power transfer.

In one embodiment, a power transfer system with a field-focusing element 18 comprises a BST material system material doped with both anions and grain boundary dopants. In one embodiment, oxygen is partially replaced by nitrogen and bismuth was disposed in the grain boundaries. An example of a BST material that had both anion doping and grain boundary doping, and that showed desirable dielectric properties, includes $Ba_{0.3}Sr_{0.7}TiO_{2.8}N_{0.13}$ doped with about 1 mole % $Bi_2O_3.3TiO_2$. The above-mentioned material showed an extremely high dielectric constant of about 1,793,610 at the frequency of about 100 Hz. However, this material had a loss tangent of about 1. This material can be used for low power transfer systems. Further, experimenting on different substitution or methods for bringing down the loss tangent value may result in a more suitable material to be used in the field-focusing element.

In one embodiment, a power transfer system with a field-focusing element 18 comprises a BST material system material doped with cations, anions, and grain boundary dopants. In embodiment, titanium is partially replaced by chromium, oxygen is partially replaced by nitrogen, and metallic bismuth is disposed in the grain boundaries. One example of a material having cation, anion, and grain boundary dopants in the BST material system is $Ba_{0.3}Sr_{0.7}Cr_{0.005}Ti_{0.995}O_{2.8}N_{0.13}$ with about 1 mole % of $Bi_2O_3.3TiO_2$. This material showed an extremely high dielectric constant greater than about 63,000 and dielectric loss tangent of about 0.006 at a frequency of about 150 kHz. Therefore, this material is very suitable for use in the field-focusing element in the power transfer system described herein.

In one example, as described earlier in Table 3, the inventors varied the starting materials for preparation of BST material system materials and noted a decrease in the loss tangent. A $Ba_{0.4}Sr_{0.6}TiO_3$ material was prepared by using $BaF_2$ and $SrF_2$ as the source of barium and strontium respectively. By starting with the fluoride sources for barium and strontium, it is expected that some of the fluorine will be substituted for oxygen, thus changing the dielectric values of the BST materials system. The $Ba_{0.4}Sr_{0.6}TiO_3$ prepared by using $BaF_2$ and $SrF_2$ showed a dielectric loss factor less than about 0.01 over the entire frequency range from 100 Hz to 10 MHz with a minimum of 0.0001 at 1.4 MHz. The material also showed a uniform dielectric constant of about 415 over the entire frequency range mentioned above. The material may be advantageously used for transmitting contactless power at any frequency range from about 100 Hz to about 10 MHz.

In one embodiment of the power transfer system, it is desirable to employ dielectric materials whose dielectric properties such as dielectric constant and loss tangent are stable over a certain temperature range around room temperature to accommodate the changes in temperature due to, for example, environmental or operational changes. In one embodiment, the dielectric materials are beneficial if their dielectric properties are substantially stable from about −50° C. to about 150° C. "Substantially stable" as used herein indicates that the dielectric properties of the materials do not change more than about 10% of their room temperature values over a given temperature range. In one embodiment, the dielectric materials presented herein are having their dielectric properties substantially stable from about −15° C. to about 120° C. In a further embodiment, the dielectric materials have dielectric properties that are substantially stable from about −20° C. to about 60° C. In one embodiment, the BST and CCT materials presented here are ceramic materials stable over a wide temperature range and having dielectric properties that are stable around room temperatures.

EXAMPLES

The following examples illustrate methods, materials and results, in accordance with specific embodiments, and as such should not be construed as imposing limitations upon the claims. All components are commercially available from common chemical suppliers.

Preparation of Materials:

A general method of preparation followed for the BST and CCT material systems identified in different examples are outlined below. However, one skilled in the art would appreciate that small variations in the starting materials; temperatures, times, and atmospheres of preparation, calcination, and sintering; size and shape variations of the prepared powders and bulk materials could be accommodated to the examples presented below.

Preparation of Pure and Doped CCT and BST Material Systems

Stoichiometric concentrations of $CaCO_3$, CuO and $TiO_2$ were mixed and ball-milled in dry conditions and calcined at 1000° C. for 24 hours in air. The calcination temperatures and atmospheres were varied for some materials to investigate the effect of temperatures and atmospheres. $BaCO_3$, $SrCO_3$, $Cr_2O_3$, $Al_2O_3$, $La_2O_3$, $Fe_2O_3$, $ZrO_2$ were added in the required mole percents by solid state mixing for doping barium, strontium, chromium, aluminum, lanthanum, iron, and zirconium dopants respectively, whenever required. About 1 mole % of $Bi_2O_3.3TiO_2$ was added for grain boundary doping. Urea was used for nitrogen doping in oxygen sites by solid state mixing and calcining. Stoichiometric amounts of $BaF_2$, $SrF_2$, and/or $CaF_2$ were used as starting materials for including a fluorine dopant in the oxygen site.

The calcined mixture was added with about 2 wt % polyvinyl actetae (PVA) and mixed thoroughly using an agate mortar. The mixture was further milled using ball milling in isopropanol medium. The powders were pressed into green pellets using hydraulic pressing with a pressure of 4 MPa followed by 6 MPa. For obtaining cold isostatic pressed (CIP) pellets, a CIP machine was used to further densify the hydrostatically pressed pellets. The pellets were then sintered at 1050° C., 1100° C., 1350° C., or 1440° C. for 2, 12, or 24 hours in air, oxygen, or nitrogen atmosphere, as required. 5% hydrogen in nitrogen atmosphere was used for reducing bismuth oxide to metallic bismuth during sintering. The sintered pellets were coated with silver paste for the purpose of dielectric measurement. The dielectric measurements were carried out using an Agilent 4294A impedance analyzer and verified using a Novocontrol Alpha-K impedance analyzer. XRDs of the calcined and sintered samples were verified. While the general method for the preparation, processing and dielectric value measurements of materials are outlined above, the examples provided below contain the specific details of preparation, processing, measurements, and results of some of the selected materials.

Example 1

$Ba_{0.55}Sr_{0.4}Ca_{0.05}TiO_3$ Processed by CIP

About 13.071 gm of $BaCO_3$, 9.579 gm of $TiO_2$, 10.152 gm of $Sr(NO_3)_2$ and 0.6 gm of $CaCO_3$ were added together and hand mixed using mortar and pestle for 15 minutes. The mixture was added with approximately equal volume of isopropanol and about 3 times by volume of zirconia grinding media and rack-milled for around 6 hours. The homogeneous mixture was transferred to an alumina crucible and calcined at 1100° C. for 2 hrs. About 2 wt % of PVA was added and mixed to the calcined powder using an agate mortar. Equal volume of isopropanol was added to the resultant material and rack-milled again.

The powder was then pressed into pellets of about 3 gram weight using hydraulic pressing with a pressure of about 4 MPa. The pellets were vacuum sealed in polyethylene film and cold isostatically pressed with about 30 MPa pressure. The pellets were sintered at 1440° C. for 2 hours in air. A silver paste coating of a few microns thickness was applied to the sintered pellets and was dried at 200° C. for 2 hours. The dielectric constant and loss tangent of the pellet was then measured using Agilent 4294A impedance analyzer. Table 10 presents the dielectric measurement results of this material.

TABLE 10

| Frequency | | Dielectric constant | Loss tangent |
|---|---|---|---|
| 100 | Hz | 3156.7 | 0.2515 |
| 1 | kHz | 2491.1 | 0.1169 |
| 10 | kHz | 2295.2 | 0.0367 |

TABLE 10-continued

| Frequency | | Dielectric constant | Loss tangent |
|---|---|---|---|
| 100 | kHz | 2238.2 | 0.0144 |
| 1 | MHz | 2208.9 | 0.0069 |
| 2.01 | MHz | 2218.8 | 0.001 |
| 10 | MHz | 3101.5 | 0.1617 |

Example 2

$Ba_{0.01}Sr_{0.2}Ca_{0.79}Cu_3Ti_4O_{12}$

About 0.079 gm of $BaCO_3$, 12.790 gm of $TiO_2$, 1.175 gm of $SrCO_3$, 3.165 gm of $CaCO_3$ and 9.554 gm of CuO were added together and hand mixed using mortar and pestle for 15 minutes. The mixture was added with approximately equal volume of isopropanol and about 3 times by volume of zirconia grinding media and rack-milled for around 6 hours. The homogeneous mixture was transferred to an alumina crucible and calcined at 1000° C. for 24 hrs. About 2 wt % of PVA was added and mixed to the calcined powder using an agate mortar. Equal volume of isopropanol was added to the resultant material and rack-milled again.

The powder was then pressed into pellets of about 3 gram weight using hydraulic pressing with a pressure of about 6 MPa. The pellets were sintered at 1100° C. for 2 hours in air. A silver paste coating of a few microns thickness was applied to the sintered pellets and was dried at 200° C. for 2 hours. The dielectric constant and loss tangent of the pellet was then measured using Agilent 4294A impedance analyzer. Table 22 presents the dielectric measurement results of this material.

TABLE 11

| Frequency | | Dielectric constant | Loss tangent |
|---|---|---|---|
| 1 | kHz | 5345.2 | 0.069 |
| 10 | kHz | 4864.5 | 0.0634 |
| 34 | kHz | 4672.2 | 0.0604 |
| 100 | kHz | 4528 | 0.0794 |
| 1 | MHz | 3638.8 | 0.3972 |
| 10 | MHz | 3638.8 | 2.904 |

Example 3

$Ca_2Cu_2Ti_{3.94}Al_{0.06}O_{11.97}$

About 8.497 $CaCO_3$, 6.753 gm of CuO, 13.357 gm of $TiO_2$ and 0.955 gm of $Al(NO_3)_3.9H_2O$ were added together and hand mixed using mortar and pestle for 15 minutes. The mixture was added with approximately equal volume of isopropanol and about 3 times by volume of zirconia grinding media and rack-milled for around 6 hours. The homogeneous mixture was transferred to an alumina crucible and calcined at 1000° C. for 24 hrs. About 2 wt % of PVA was added and mixed to the calcined powder using an agate mortar. Equal volume of isopropanol was added to the resultant material and rack-milled again.

The powder was then pressed into pellets of about 3 gram weight using hydraulic pressing with a pressure of about 6 MPa. The pellets were sintered at 1100° C. for 2 hours in air. A silver paste coating of a few microns thickness was applied to the sintered pellets and was dried at 200° C. for 2 hours. The dielectric constant and loss tangent of the pellet was then measured using Agilent 4294A impedance analyzer. Table 12 presents the dielectric measurement results of this material.

TABLE 12

| Frequency | Dielectric constant | Loss tangent |
|---|---|---|
| 3.41 kHz | 2354.4 | 0.021 |
| 3.83 kHz | 2344.4 | 0.0173 |
| 10 kHz | 2303.1 | 0.0353 |
| 100 kHz | 2203.7 | 0.0612 |
| 1 MHz | 1948.4 | 0.349 |
| 10 MHz | 706.7 | 1.16 |

Advantageously, power transfer systems as disclosed in certain embodiments herein are configured to include field-focusing elements and are less sensitive to the variations in the load as the frequency of resonance. As described herein, field-focusing element 18 may be used for enhancing magnetic field focus and efficiency of the contactless power transfer system. Further, the field-focusing element comprises a dielectric material that includes a BST material system, a CCT material system or a combination of both. Use of the dielectric materials increases the magnetic field-focusing of the field-focusing element such that power and data transmission can be achieved simultaneously across the primary coil, field-focusing element, and secondary coil.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power transfer system comprising:
a first coil coupled to a power source;
a second coil coupled to a load; and
a field-focusing element comprising two open ends, disposed between the first coil and the second coil and comprising a dielectric material, wherein the dielectric material comprises $Ca_{1-x-y}Ba_xSr_yTi_{1-z}Cr_zO_{3-\delta}N_p$, wherein $0<x<1$; $0.4\leq y<1$; $0\leq z\leq 0.01$; $0\leq \delta\leq 1$; and $0\leq p\leq 1$; and wherein the field-focusing element is configured to develop a standing wave current distribution and focus the magnetic field onto the second coil.

2. The system of claim 1, wherein $0.9\leq x+y<1$.

3. The system of claim 2, wherein $0.3\leq x$, and $x+y=1$.

4. The system of claim 1, wherein density of the dielectric material is greater than about 96% of the theoretical density.

5. The system of claim 1, wherein the dielectric material is a polycrystalline material comprising grains and grain boundaries and wherein the dielectric material further comprises a metallic bismuth phase disposed at the grain boundaries.

6. The system of claim 1, wherein $z>0$, and $\delta$ and p are both equal to 0.

7. The system of claim 1, wherein $z=0$, and $\delta$ and p are both greater than 0.

8. The system of claim 1, wherein z, $\delta$, and p are all greater than zero.

9. The system of claim 1, wherein the dielectric material comprises $Ba_{0.3}Sr_{0.7}Cr_{0.005}Ti_{0.995}O_{2.8}N_{0.13}$.

10. The system of claim 1, wherein the dielectric material further comprises fluorine in an amount less than about 1 atomic percent.

11. The system of the claim 1, wherein the first coil and the second coil are spaced apart from the field-focusing element.

12. A power transfer system comprising:
a first coil coupled to a power source;
a second coil coupled to a load; and
a field-focusing element disposed between the first coil and the second coil and comprising a dielectric material, wherein the dielectric material comprises $Ca_{1-x-y}Ba_xSr_yTi_{1-z}Cr_zO_{3-\delta}N_p$, wherein $0<x<1$, $0.4\leq y<1$; $0\leq z\leq 0.01$; $0<\delta\leq 0.5$; and $0<p\leq 0.4$.

13. The power transfer system of claim 1, wherein the field-focusing element comprises a plurality of resonators arranged in an array, wherein the plurality of resonators is configured to interfere constructively when excited by different phases.

14. The system of claim 12, wherein the dielectric material further comprises fluorine in an amount less than about 1 atomic percent.

15. The system of claim 12, wherein $0.9 \leq x+y \leq 1$.

16. The system of claim 15, wherein $0.3 \leq x$, and $x+y=1$.

17. The system of claim 12, wherein $z=0$.

18. The system of claim 12, wherein the dielectric material comprises $Ba_{0.3}Sr_{0.7}Cr_{0.005}Ti_{0.995}O_{2.8}N_{0.13}$.

19. The system of claim 12, wherein the dielectric material is a polycrystalline material comprising grains and grain boundaries and wherein the dielectric material further comprises a phase comprising bismuth disposed at the grain boundaries.

20. The system of the claim 12, wherein the first coil and the second coil are spaced apart from the field-focusing element.

21. A power transfer system comprising:
a first coil coupled to a power source;
a second coil coupled to a load; and
a field-focusing element disposed between the first coil and the second coil, and comprising a dielectric material, wherein the dielectric material comprises $Ba_{0.3}Sr_{0.7}Cr_{0.002}Ti_{0.998}O_3$.

22. The system of claim 21, wherein the dielectric material is a polycrystalline material comprising grains and grain boundaries and wherein the dielectric material further comprises a metallic bismuth phase disposed at the grain boundaries.

* * * * *